(12) United States Patent
Keen et al.

(10) Patent No.: US 9,474,377 B2
(45) Date of Patent: Oct. 25, 2016

(54) UPRIGHT ACTIVE-SITTING SEAT

(71) Applicant: Safco Products Co., Minneapolis, MN (US)

(72) Inventors: Martin Keen, Jamestown, RI (US); Ryan M. Coyle, Providence, RI (US); Diau P. Hall, Cranston, RI (US); Justin W. Sirotin, Providence, RI (US)

(73) Assignee: Safco Products Co., Minneapolis, MN (US)

( * ) Notice: Subject to any disclaimer, the term of this patent is extended or adjusted under 35 U.S.C. 154(b) by 214 days.

(21) Appl. No.: 13/890,557

(22) Filed: May 9, 2013

(65) Prior Publication Data

US 2013/0306831 A1 Nov. 21, 2013

Related U.S. Application Data

(60) Provisional application No. 61/647,899, filed on May 16, 2012.

(51) Int. Cl.
*A47C 9/02* (2006.01)
*A47C 7/02* (2006.01)
(Continued)

(52) U.S. Cl.
CPC .............. *A47C 7/025* (2013.01); *A47C 7/506* (2013.01); *A47C 9/002* (2013.01); *A47C 9/025* (2013.01); *F16C 11/12* (2013.01); *F16C 11/0614* (2013.01); *Y10T 403/32614* (2015.01)

(58) Field of Classification Search
CPC ........ A47C 3/12; A47C 13/22; A47C 7/025; A47C 3/18; A47C 3/30; A47C 9/025; A47C 9/002; A47C 7/004; A47C 9/022; A47C 9/005; A47C 9/08; A47C 9/02; A47C 9/007; A47C 3/025; A47C 3/026; A47C 3/20; A47C 3/185; A47C 7/14; A61H 1/0237; A63B 21/02; A47B 9/00; F16C 11/12

USPC .............. 248/371, 372.1, 158, 599, 622; 297/461, 462, 338, 337, 313, 314, 297/344.21, 344.19, 115, 116, 135, 297/160–162; 482/121, 34, 77, 79, 80, 122, 482/123, 127–130, 146–148

See application file for complete search history.

(56) References Cited

U.S. PATENT DOCUMENTS 483,266 A * 9/1892 Schindler ...................... 248/397
605,151 A * 6/1898 Twist ............................. 297/202
(Continued)

FOREIGN PATENT DOCUMENTS

DE 826113 U1 8/1982
DE 8416541 U1 8/1984
(Continued)

OTHER PUBLICATIONS

Advantage Branch & Office Systems, Advantage Branch Ergomatrix Chair, "http://advantagebranch.com/Chair.html" (accessed Oct. 13, 2011).
(Continued)

*Primary Examiner* — Nkeisha Smith
(74) *Attorney, Agent, or Firm* — Fredrikson & Byron, P.A.

(57) ABSTRACT

An upright active-sitting seat provides a connection of a seating leg to a base through an articulating joint that allows the user to move a seat front to back and side to side, allowing a more active sitting that encourages blood circulation. The chair includes a seat supported by a post that is connected to a mount via a ball joint rod by a transverse rod that is routed through the ball joint rod end. By way of a coil spring that engages with the mount and the post, the post is spring biased to a home position relative to the mount. When using the chair, a person may move the seat from the home position to a comfortable seating position. When the person stands from the chair after using it, the chair returns to its spring biased home position.

14 Claims, 18 Drawing Sheets

(51) Int. Cl.
*F16C 11/12* (2006.01)
*A47C 7/50* (2006.01)
*A47C 9/00* (2006.01)
*F16C 11/06* (2006.01)

(56) References Cited

U.S. PATENT DOCUMENTS

| | | | |
|---|---|---|---|
| 612,580 A * | 10/1898 | Banes | 108/2 |
| 619,596 A * | 2/1899 | Mayer | 248/398 |
| 1,194,551 A * | 8/1916 | Schossler | 108/2 |
| 1,209,254 A * | 12/1916 | Blizard | 297/172 |
| 1,731,375 A | 10/1929 | Engers | |
| 2,550,992 A * | 5/1951 | Goodrich | 482/128 |
| 2,551,966 A | 5/1951 | Cherubini | |
| 3,103,356 A * | 9/1963 | Heines | 472/4 |
| 3,312,437 A | 4/1967 | Barth | |
| 3,704,847 A | 12/1972 | Schmitt | |
| 4,099,697 A * | 7/1978 | Von Schuckmann | 248/604 |
| 4,130,263 A | 12/1978 | Roericht | |
| 4,517,966 A * | 5/1985 | von Othegraven | 482/122 |
| 4,685,733 A | 8/1987 | Machate et al. | |
| 4,738,487 A | 4/1988 | Shalinsky et al. | |
| 4,768,831 A * | 9/1988 | Liedberg et al. | 297/344.19 |
| 5,042,716 A | 8/1991 | Robbins | |
| 5,054,852 A | 10/1991 | Tholkes | |
| 5,149,174 A | 9/1992 | Charash | |
| 5,295,728 A | 3/1994 | Schaevitz | |
| 5,303,981 A | 4/1994 | Wilder et al. | |
| D349,820 S | 8/1994 | Schaevitz | |
| 5,409,296 A | 4/1995 | Barile | |
| 5,542,674 A * | 8/1996 | Kim | 473/218 |
| 5,630,648 A | 5/1997 | Allard et al. | |
| 6,088,946 A | 7/2000 | Simmons | |
| D467,745 S | 12/2002 | Ryan | |
| 6,644,742 B1 * | 11/2003 | Walser | 297/314 |
| 6,644,748 B2 * | 11/2003 | Tholkes et al. | 297/423.12 |
| 6,679,554 B2 | 1/2004 | Anders | |
| 6,793,284 B1 * | 9/2004 | Johnson et al. | 297/302.3 |
| 6,820,936 B2 * | 11/2004 | Wilkerson et al. | 297/300.2 |
| 6,997,511 B2 * | 2/2006 | Marchand et al. | 297/314 |
| 7,293,825 B2 | 11/2007 | Vergara et al. | |
| 7,314,248 B2 | 1/2008 | Mabon et al. | |
| 7,367,623 B2 | 5/2008 | Tholkes et al. | |
| 7,401,856 B2 * | 7/2008 | Marchand et al. | 297/314 |
| 7,478,878 B2 | 1/2009 | Oettinger | |
| 7,614,639 B2 | 11/2009 | Tholkes et al. | |
| 8,066,624 B1 * | 11/2011 | Stroup | 482/121 |
| 8,540,314 B2 * | 9/2013 | Fernandez | 297/314 |
| 8,607,725 B2 * | 12/2013 | Degirmenci | 116/222 |
| D697,328 S * | 1/2014 | Keen et al. | D6/353 |
| 8,998,319 B2 * | 4/2015 | Bahneman et al. | 297/270.5 |
| 2009/0001788 A1 * | 1/2009 | Lenz et al. | 297/217.4 |
| 2009/0230743 A1 * | 9/2009 | Derakhshan et al. | 297/329 |
| 2009/0278391 A1 * | 11/2009 | Ulrich | 297/283.1 |
| 2011/0175414 A1 * | 7/2011 | Asbjornsen | 297/313 |
| 2011/0247545 A1 * | 10/2011 | Degirmenci | 116/222 |
| 2012/0086252 A1 * | 4/2012 | Hong | 297/344.21 |

FOREIGN PATENT DOCUMENTS

| | | |
|---|---|---|
| DE | 20200901438 U1 | 5/2010 |
| EP | 1932451 A1 | 6/2008 |
| JP | 20020028043 A | 1/2002 |
| WO | 2008034529 A2 | 3/2008 |

OTHER PUBLICATIONS

Workalicious, Stitz Task Stool by Wilkhahn, "http://www.workalicious.org/2009/04/stitz-task-stool-by-wilhahn_4209 . . . ", Apr. 27, 2009 (accessed Oct. 13, 2011).
Barry Bennett Ltd, Kango Stand Up Stool Height Range 70-90CM, "http://shop.barrybennett.co.uk/Kango-Stand-Up_Stool_height-Range-70-90CM" (accessed Oct. 13, 2011).
Swopper.com.au, Muvman::Sit Stand Chair, "http://www.swopper.com.au/muvman.php" (accessed Mar. 23, 2012).
United States Department of Labor, OSHA, Sit Stand Stools, "http://www.osha.gov/SLTC/etools/poultry/additional_material.html" (accessed: Mar. 21, 2012).
Rhino STOH 1Sit/Stand Stool With Cleanroom Option, "http://www.nextag.com/RhinoSTOH1-Sit_Stand_544620106/prices-html" (accessed Mar. 21, 2012).

* cited by examiner

UPRIGHT ACTIVE-SITTING SEAT

CROSS REFERENCE TO RELATED APPLICATION

This application is related to and claims priority from earlier filed provisional patent application Ser. No. 61/647,899, filed May 16, 2012, the entire contents thereof is incorporated herein by reference.

BACKGROUND OF THE INVENTION

The invention relates generally to seating. In particular, the present invention relates to seating, such as chairs and other support structures. The invention relates to a piece of furniture to replace or compliment a traditional sit down chair and/or sit down workstation.

Seating is very well known in the prior art. Seating is, traditionally, of the configuration and arrangement where the user "sits down." For example, a bench, chair or sofa employs this common configuration.

However, many people find that the traditional "sitting down" position assumed when using typical office seating has, over time, a detrimental impact on the physical body. The result of this constant sedentary position, that does not encourage or allow for a great deal of physical movement, has recently come to be known as "sitting disease." Remaining in this traditional sitting position over extended periods of time day after day has been proven, based on a 2010 study by the American Cancer Society and published in the American Journal of Epidemiology, to have the effect of potentially shortening one's life. The study shows that an individual is up to 71% (men and women combined) more likely to die younger if s/he were inactive and sat over 6 hours per work day.

There have been many attempts in the prior art to address the shortcomings of prior art seating of the "sitting down" position. For example, below are a number of prior art chairs that seek to address these shortcomings. However, as will be described below, these seating devices fail to adequately meet the needs of the user to avoid "sitting disease."

For example, as in FIGS. 1a-d, U.S. Pat. Nos. 7,367,623 and 6,644,748, sold by Health Postures Inc. under the brand "Stance Chair" provide seating that attempts to avoid the "sitting down" position. While it is more of a traditional chair (albeit rather cumbersome looking) that converts to an upright leaning chair, it does not support the pelvis and sitz bones in the same way as this new invention. While it does allow the user to choose between a leaning and sitting posture both positions are very static and freedom of movement while working is not enhanced. This is problematic when it is used for extended periods of time. The seat of the Stance Chair is simply a traditional flat cushion seat that is raised and tilted at an angle when in the leaning position. This prior art seat fails to include a more desirable and comfortable contoured "tractor" or "saddle" seat design that allows for more of a perching position. While there are a number of other "leaning devices" in the prior art, none of them, except the Stance Chair of FIG. 1, have a footrest connected by a baseplate incorporated into their design.

Turning now to FIG. 2, another prior art sitting device is shown. FIG. 2 illustrates a sitting device from Muvman (Aeris-Impulsmobel Gmbh & Co.) of Germany. This device is a leaning seat has an innovative and patented "movement encouraging" connection 68 between the baseplate 62 and seat support 66 that is referred to as the "Flexzone". Connection 68 is a simple ball and socket joint. The seat support 66 is connected to the baseplate 62 by a post that can move between a seated position 64A and a standing position 64B as a user moves from a seated position 60A to a standing position 60B. However, this sitting device is devoid of a connected footrest.

The foregoing prior art sitting devices fail to adequately address the shortcomings of the prior art. As a result, there is a need for a seat with which one can assume a more healthful and active work posture. There is a desire for a an upright "neutral posture" that promotes active-sitting and active-working while still maintaining the needed feeling of stability and security. There is a need for a leaning/sitting platform that can be easily adjusted to fit an individual's height and preferred leaning/sitting angle. There is a further need for an improved joint connection of the post of a seat. There is a need for length, angle and height adjustment. There is a need for an angled footrest that can provide a force that opposes the force generated by the tendency for the feet (while the body is in the leaning posture) to slide forward, away from the seat location.

SUMMARY OF THE INVENTION

The present invention preserves the advantages of prior art seating. In addition, it provides new advantages not found in currently available seating and overcomes many disadvantages of such currently available seating.

The upright active sitting or lean seat of the present invention combats the tendency toward a sedentary work life by providing a more dynamic upright almost standing posture that promotes constant movement or more "active working." The invention incorporates a saddle seat on which to sit/lean, an angled footrest connected to the seat by way of a base plate (or standing work area) and an adjustable height single leg on which the seat is connected by a unique articulating universal joint. A triangle, for improved support by triangulation, is formed by the user and the device of the present invention at the three points of the user to the seat saddle, the user's feet to the foot rest and the connection of the post to the base via the articulating joint.

More specifically, the universal joint allows for some limited and controlled, side to side movement (approximately 4 degrees) and substantial fore and aft movement. The universal joint is much more than a simple ball and socket joint. The universal joint of the present invention uniquely provides free movement between the seat post and baseplate allows for more 'active' sitting that encourages greater blood circulation thus enhancing concentration and alertness. This enables the seat of the present invention to be tiltable in a back and forth direction. In one embodiment the seat has a footstep, and in another embodiment the base is attached to a workstation. The attachment between the base and a post is a ball joint connection that enables an articulating motion. The joint connection spring biases the post with seat thereon into a very upright position. The user pulls down (against the forces of the spring of the connection) to locate it underneath them. Then, when they are finished using the seat they simply stand up and the post (and seat saddle) spring back up out of the way. The foregoing is not possible in prior art seating devices.

Therefore, an object of the present invention is to provide a seat with which one can assume a more healthful and active work posture.

A further object of the present invention is to provide an upright "neutral posture" that promotes active-sitting and active-working while still maintaining the needed feeling of stability and security.

Another object of the present invention is to provide a leaning/sitting platform that can be easily adjusted to fit an individual's height and preferred leaning/sitting angle.

Another object of the present invention is to provide a sitting device that is customizable through length adjustment of the baseplate, height adjustment of the single leg and angle adjustment of the seat to leg joint.

Yet another object of the present invention is to provide a connected angled footrest to provide a force that opposes the force generated by the tendency for the feet (while the body is in the leaning posture) to slide forward, away from the seat location.

There is a further object of the present invention to provide a seat with a joint connection that allows free movement of the seat of the present invention.

Another object of the present invention is to provide a seat with a joint that connection that provides for a spring-biased seat that moves out of the way when it is no longer needed.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE INVENTION

Figures 1A, 1B:
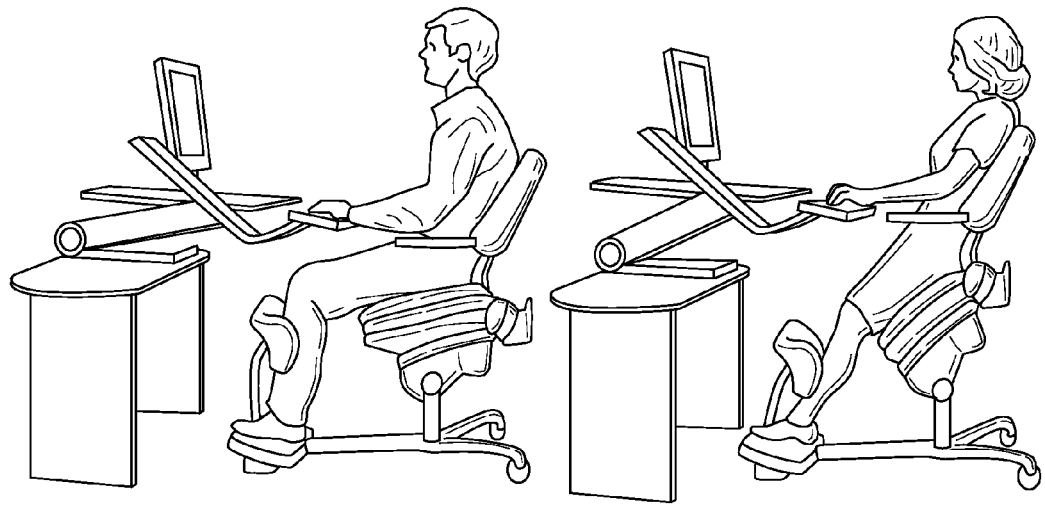
FIG. 1a is a view of a first prior art chair.
FIG. 1b is another view of the prior art of FIG. 1.
Figures 1C, 1D:
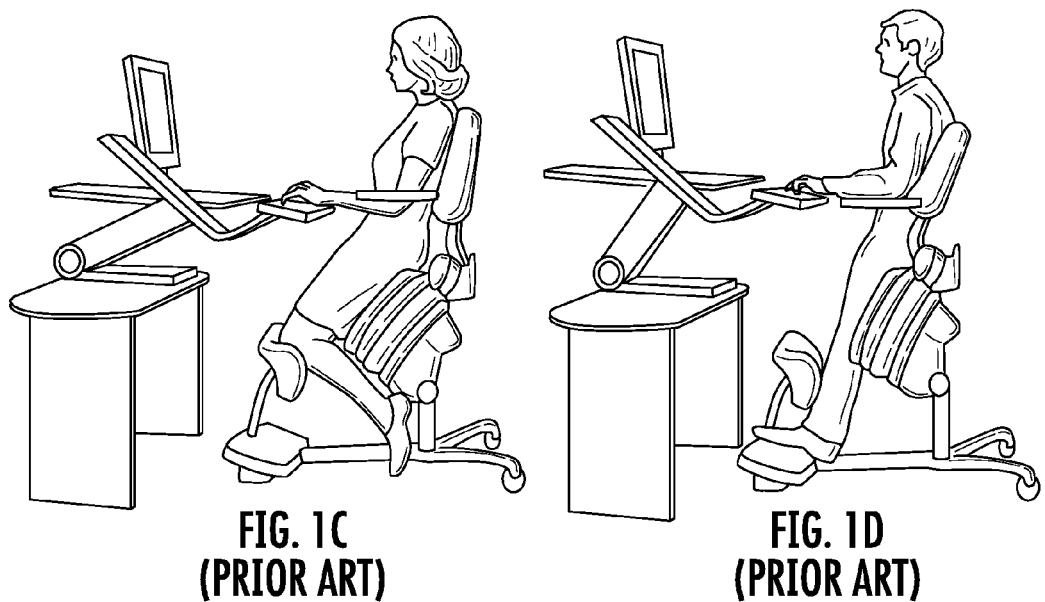
FIG. 1c is another view of the prior art chair of FIG. 1.
FIG. 1d is another view of the prior art chair of FIG. 1.
Figure 2:
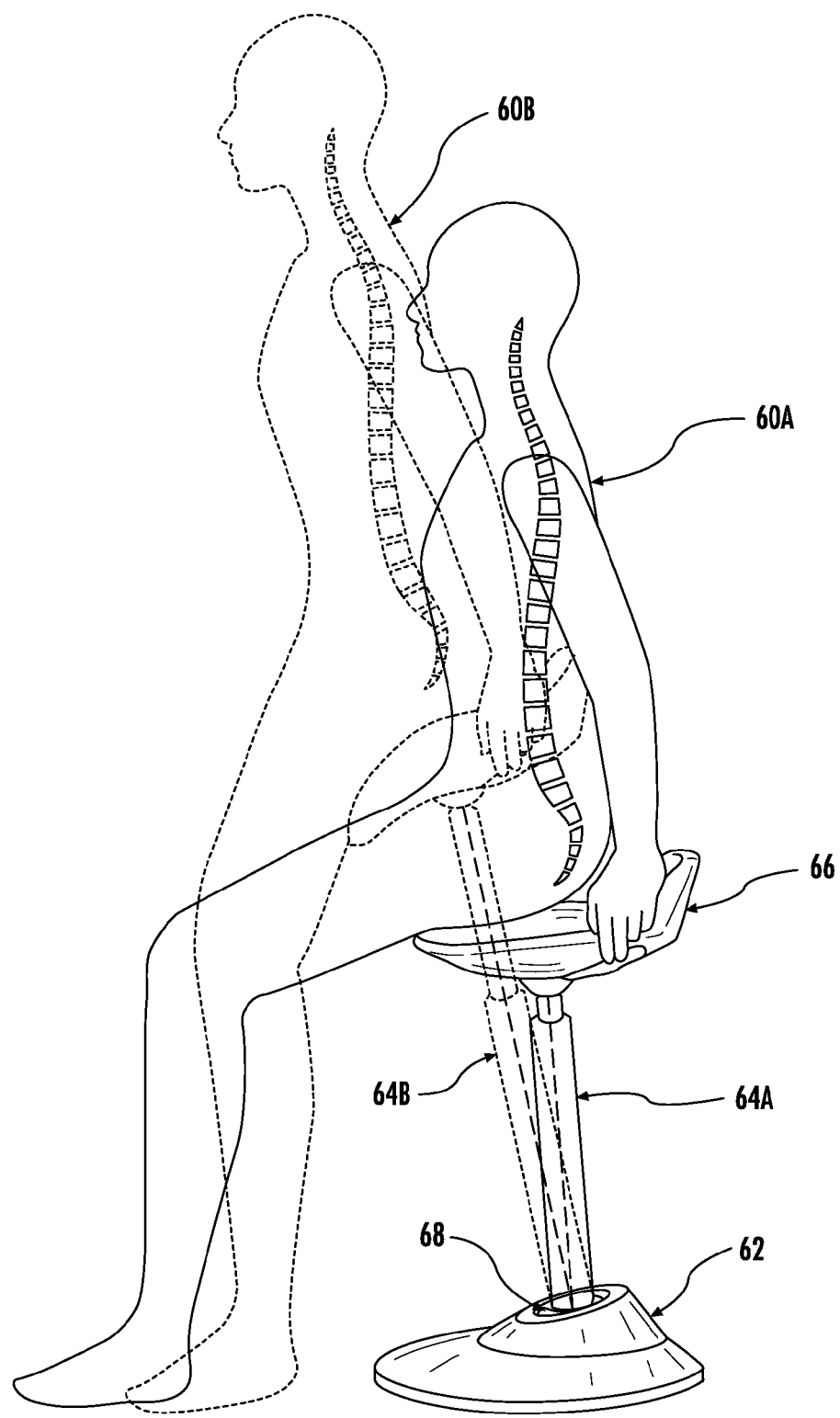
FIG. 2 is a view of a second prior art chair.

FIGS. 3-9 show a preferred embodiment of the seat of the present invention.

The upright active-sitting seat 10 of the present invention includes of an adjustable base (or baseplate) 12, an angled footrest 14 supported by wheels 40, a spring-loaded universal joint (or articulating joint) 30 (shown in detail in FIGS. 11-17) contained in a mount 11, a single pneumatically adjustable leg 18, an ergonomically designed seat pan 20, a self molding seat cushion 22, and a living hinge seat to leg connection 24, an adjustment lever 26 to adjust the seat pan and a foot peg 28 for controlling the pneumatics of the adjustable leg, such as releasing the leg to lengthen the seat height and retracting the seat height when extended.

Figure 3:
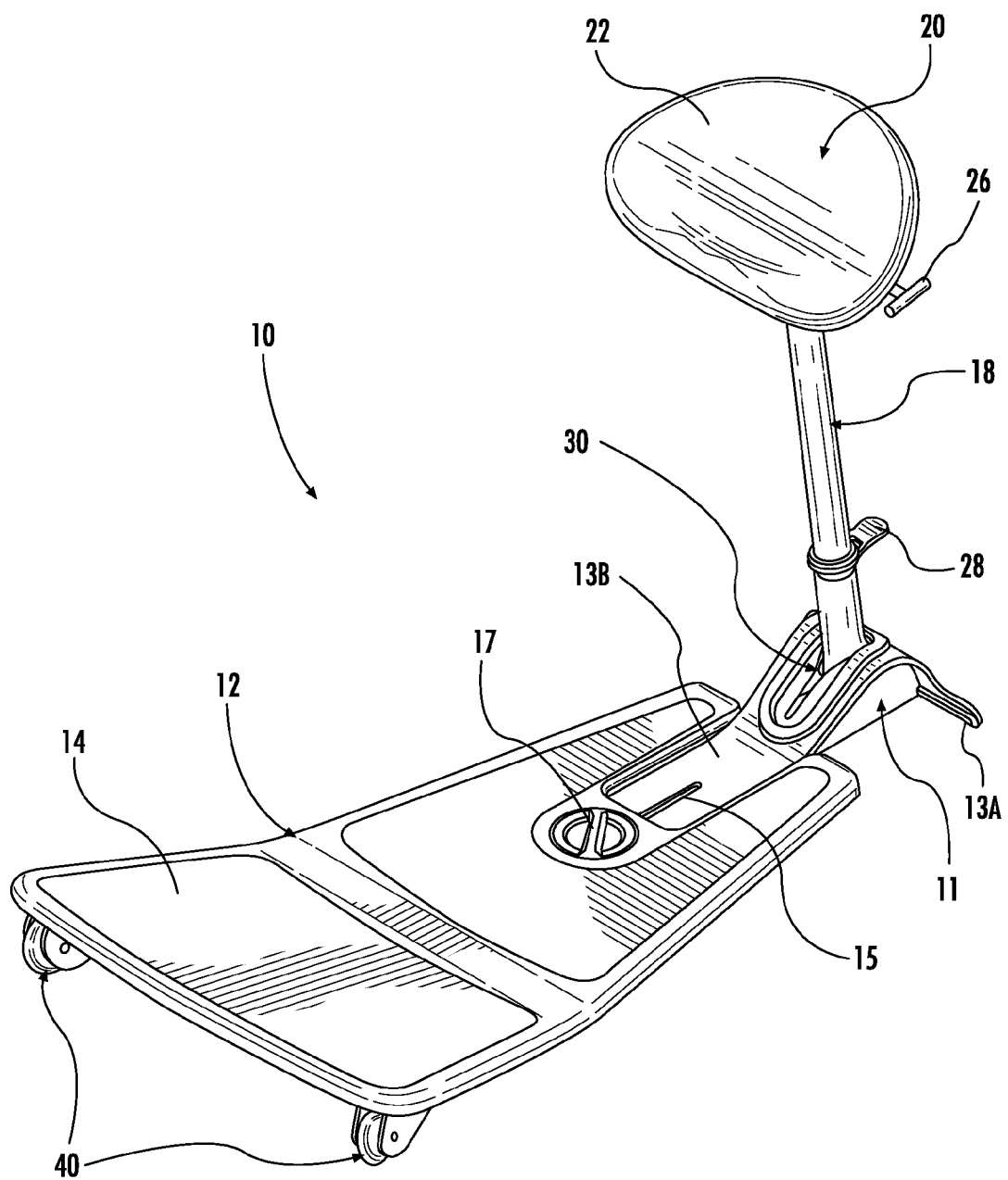
FIG. 3 is a perspective view of a preferred embodiment of the present invention.

As can be seen in FIG. 3, the present invention is an upright leaning chair, which supports the pelvis and sitz bones. It allows for the user to rotate the leg 18 forward and back about the base 12, and thus choose between a leaning or sitting posture, both positions to provide freedom of position and movement while working. As will be discussed below, the leg can uniquely move in any direction, including front to back and side to side and positions in between. The present invention preferably uses a contoured "tractor" or "saddle" design for the seat pan 20 and seat cushion 22 that allows for more of a perching position and added comfort. However, any type and configuration of seat pan can be used and still be within the scope of the present invention.

As shown in FIG. 3, the mount 11, which contains the articulating joint 30, has a rear leg 13A and a front leg 13B that support it. The front leg 13B of the mount 11 is connected to the base 12 having a footrest 14. The base 12 is releasably connected to the mount by a fastener 17 on the base that is received through a hole in the base 12 and then through a slot 15 in the front leg 13B and into a fastener receiver 19 such that the distance from the footrest to the mount can be adjusted and then secured in place by releasing the fastener and sliding the front leg 13B in or out of an opening in the base 12, according to user preferences.

Figure 8:
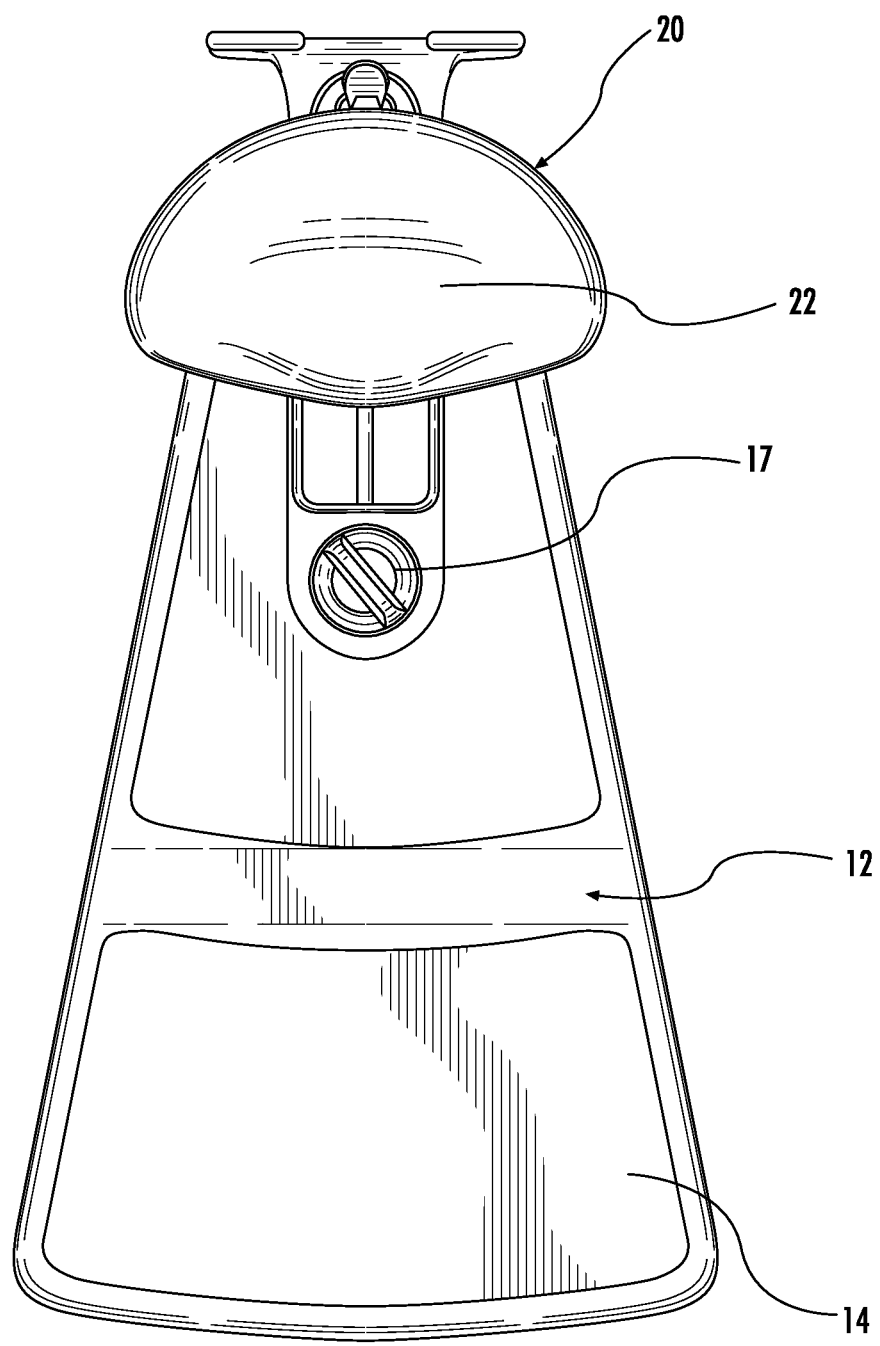
FIG. 8 is a top view of the seat of FIG. 3.
Figure 9:
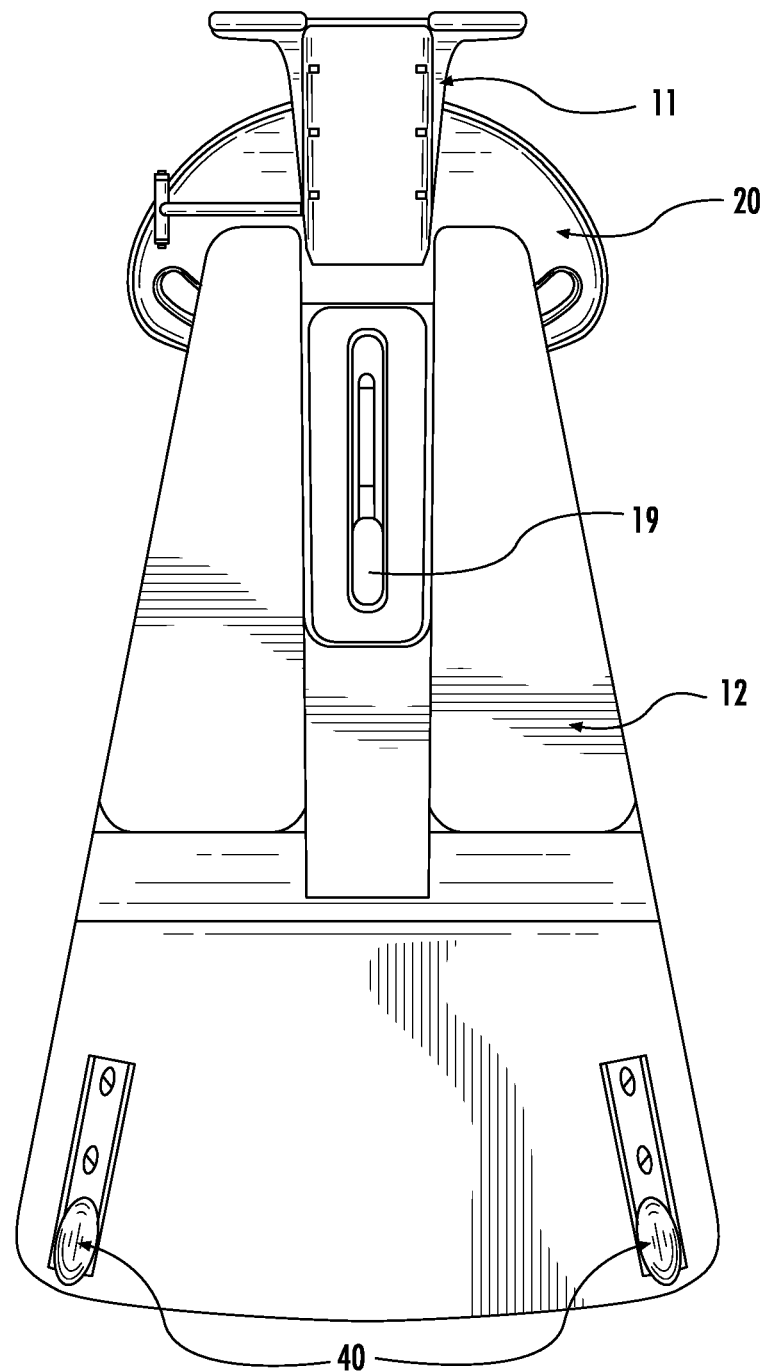
FIG. 9 is a bottom view of the seat of FIG. 3.

The fastener 17 may be a male threaded fastener, and it may be received in a female threaded receptacle on the opposite side of the front leg 13B. FIGS. 8 and 9 show one embodiment of a possible fastener 17 and fastener receiver 19 that can be used in the present invention. Alternative fastening means may be used. For example, a clamping mechanism a ratcheting mechanism, or any other mechanism capable of releasably locking the front leg 13B in place relative to the base 12.

Figure 4:
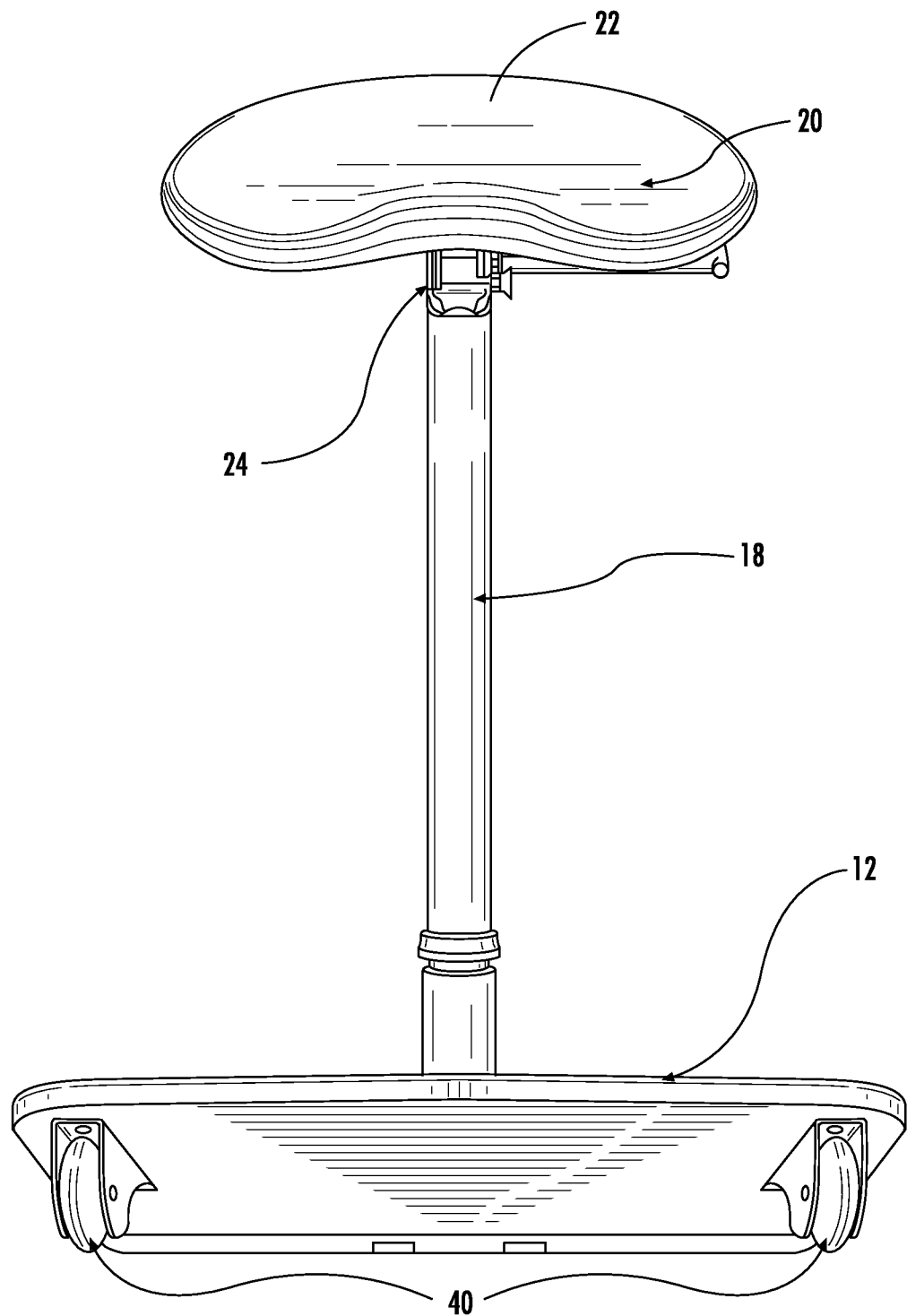
FIG. 4 is a front view of the seat of FIG. 3.
Figure 5:
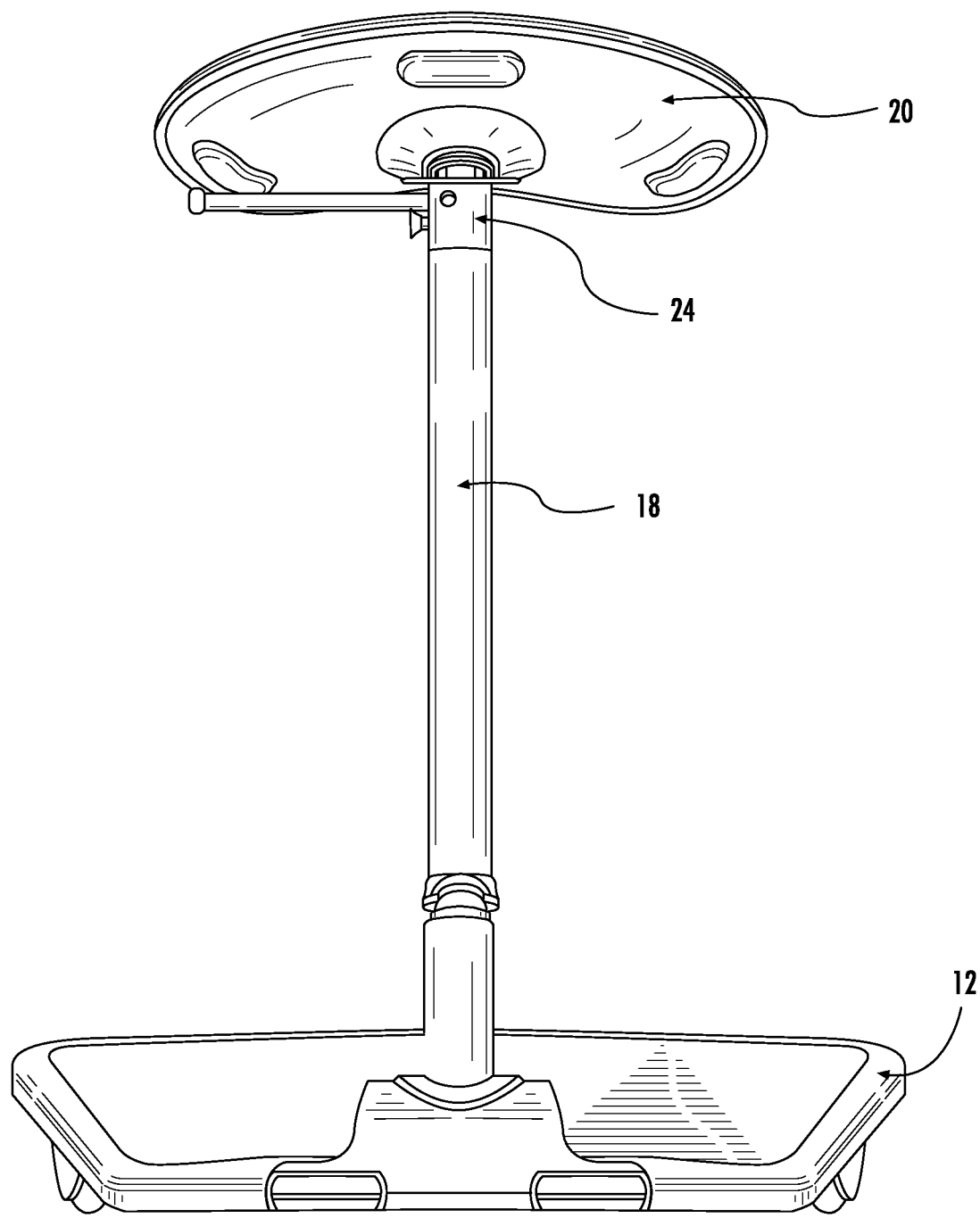
FIG. 5 is a rear view of the seat of FIG. 3.

FIGS. 4 and 5 show front and rear views, respectively, of one embodiment of the upright active sitting seat of the present invention. In these front and rear views, the chair is shown with a leg 18 that is in substantially vertical alignment with respect to the base 12. The spring-loaded universal joint 30 allows the leg 18 to rotate front to back and rotate side to side with respect to the base, as discussed below. The living hinge 24 that connects the seat pan 20 to the pneumatically adjustable leg (or post) 18 allows the seat to adjust to a comfortable angle with respect to the leg as the leg is adjusted to a comfortable height and angle with respect to the base 12. The leg may be adjustable to a comfortable height using a pneumatic cylinder within the leg.

The seat is supported on the ground by wheels 40 at one end and the rear leg 13A at the other end. Wheels 40 enable easy transport of the device by rolling. FIG. 4 shows that the wheels 40 under the footrest 14 are spaced apart so that they provide proper lateral support for the seat structure. At the other end of the base, the rear leg 13A is elongated laterally to provide additional lateral support. The distance between the wheels and the length of the elongated rear leg can be adjusted to maximize the stability provided by the base when the seat is rotated side to side about the articulating joint as discussed below.

Figure 6:
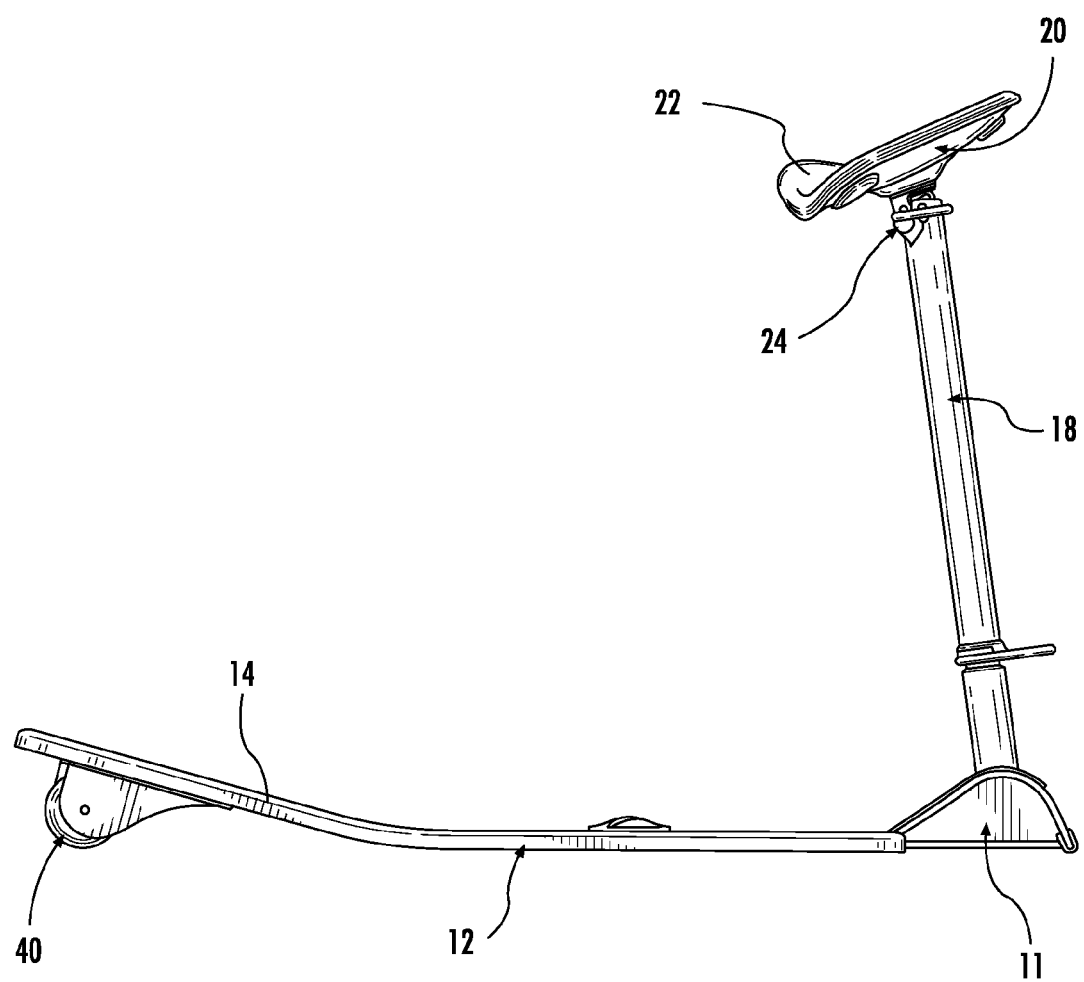
FIG. 6 is a right side view of the seat of FIG. 3.
Figure 7:
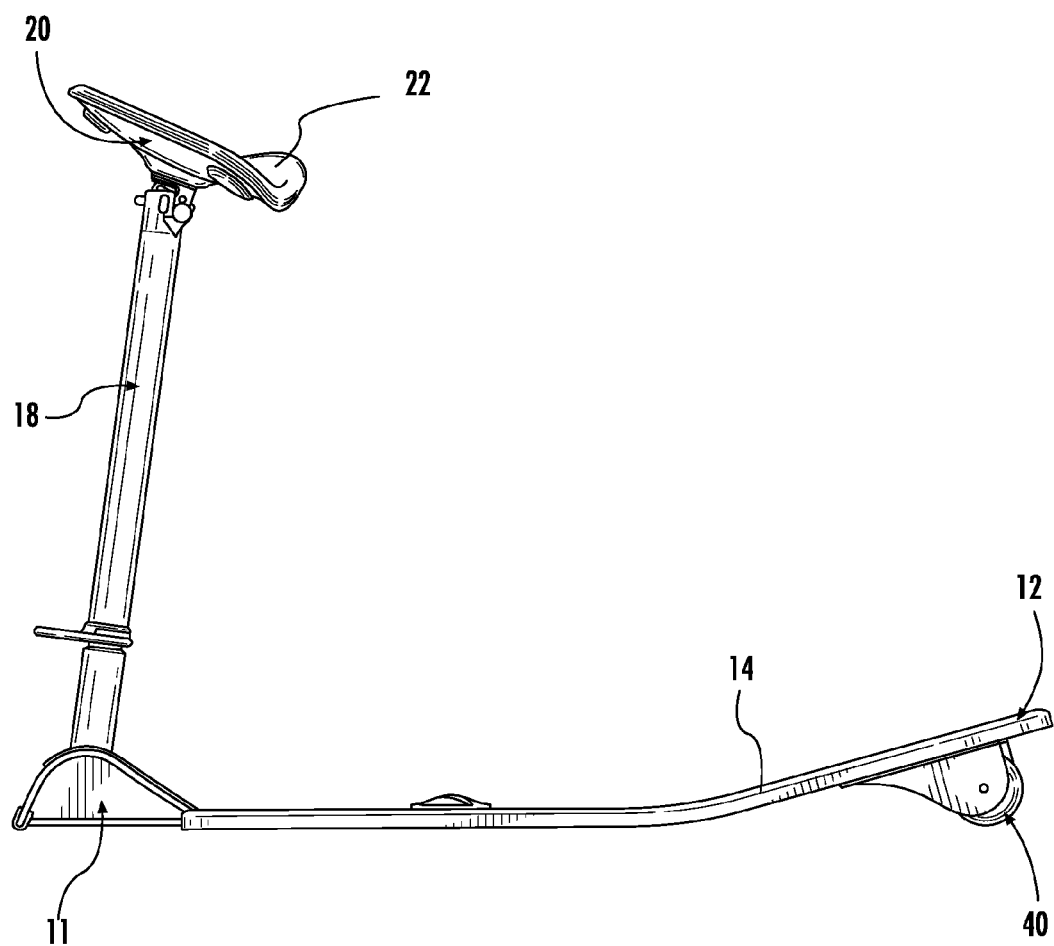
FIG. 7 is a left side view of the seat of FIG. 3.

The wheels 40 and the rear leg 13A also provide support, as the seat is rotated forward and back about the articulating joint during use, as discussed below. FIGS. 6 and 7 show left and right side views of one embodiment of the upright active sitting seat of the present invention. Here, the spring-biased forward angle of the leg 18 with respect to the base 12 is visible. The angles of the footrest and the leg with respect to the base can be adjusted to maximize user comfort in other embodiments.

The spring-biased position of the post is shown in FIG. 6 as being substantially vertical, though not completely vertical. In various embodiments of this invention, it is possible to provide a joint connection 30 with a post 18 that is spring biased to a perfectly vertical or substantially vertical position, such that when a user stands up from the seat, the seat 20 springs up and out of the way of the user. In other embodiments, the post could be spring biased to another position that is behind the user when the user stands up from the seat.

FIGS. 8 and 9 also show how the rear leg 13A is located at a greater longitudinal distance from the footrest 14 than the seat 20 is. Thus, the center of gravity of the user will be between the wheels 40 and the rear leg 13A when in use, thereby increasing longitudinal stability of the seat.

The upright active sitting seat of the present invention uses a unique articulating joint connection 30 to provide the freedom of position and movement. Referring to FIGS. 11-17, the joint connection of the present invention is shown in detail. This articulating joint 30 connects the post (or leg) 18 to the base (or baseplate) 12. The joint enables the post 18 to move side to side and front to back (and in between) with full freedom of motion, as shown by the arrows A and A' in FIG. 11. This is important so that when someone sits on the seat, they can move it easily on the fly for the most comfort.

Figure 11:
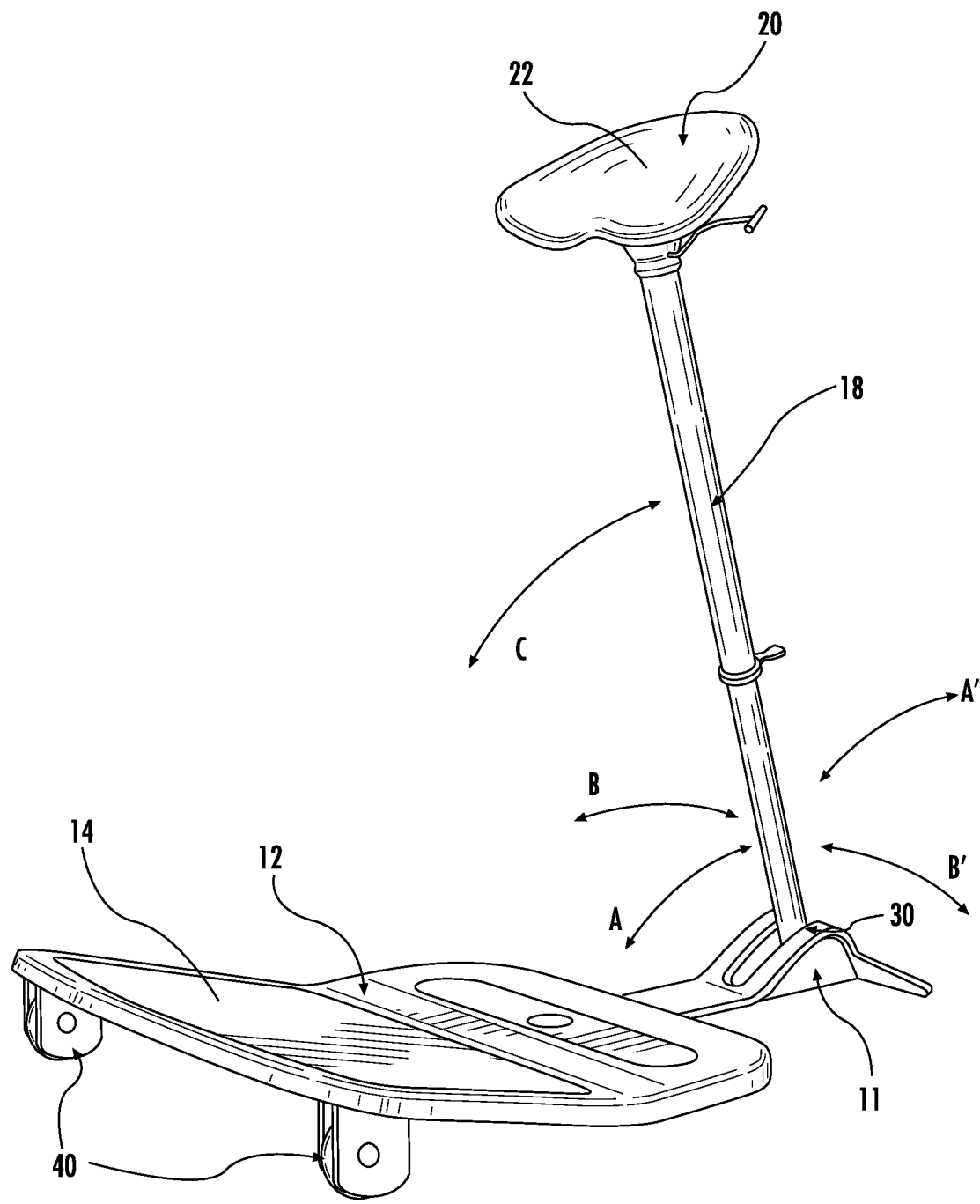
FIG. 11 is a perspective view of the seat of FIG. 3 showing the different directions of movement of the post.
Figure 12:
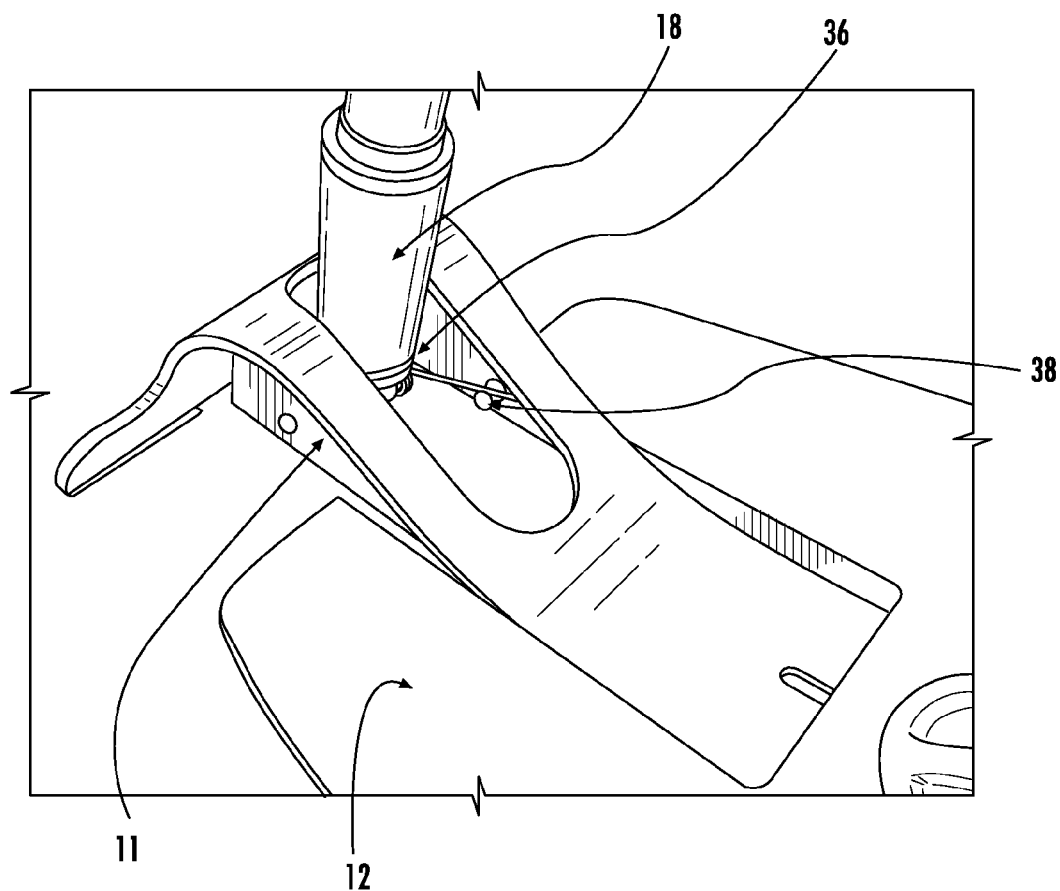
FIG. 12 shows a perspective view of one embodiment of the joint connection of the present invention.

As shown in FIG. 11, the seat is spring biased in the direction C, so that the user can move the post 18 to a comfortable position when using the seat. The ball joint rod end 32, as seen in FIGS. 13-17 and 18a-d, allows for rotation of the post forward and back along the arrows A and A' as well as side-to-side along the arrows B and B'. In one embodiment, the rotation of the post along the arrows B and B' is limited to roughly 4 degrees. Limited side-to-side mobility improves stability of the seat. Still, some embodiments may allow for more or less side-to-side play along the arrows B and B', according to user preferences.

In one embodiment, the joint connection 30 spring-biases the post 18 with seat 20 thereon into a very upright position. The user pulls down (against the forces of the spring of the connection) to locate it underneath them. Then, when they are finished using the seat, they simply stand up and the post 18 (and seat saddle 20) springs up out of the way. See FIG. 11. The internal construction is shown in FIGS. 12-17, which provides the desired articulating motion and spring-biasing action. This joint uses a "steel ball joint rod end" 32 (an example of one is shown in FIGS. 18a-d) to provide the side-to-side play in the connection.

Figure 13:
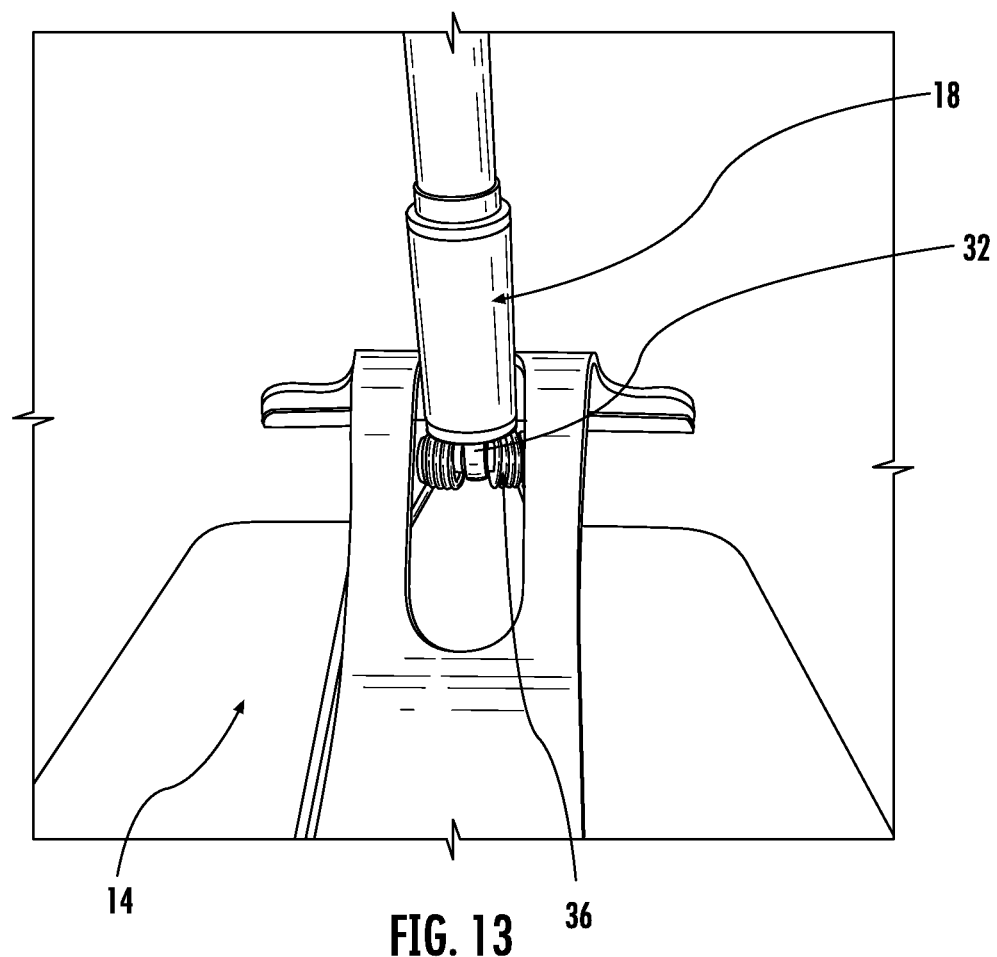
FIG. 13 shows a front elevational view thereof.
Figure 14:
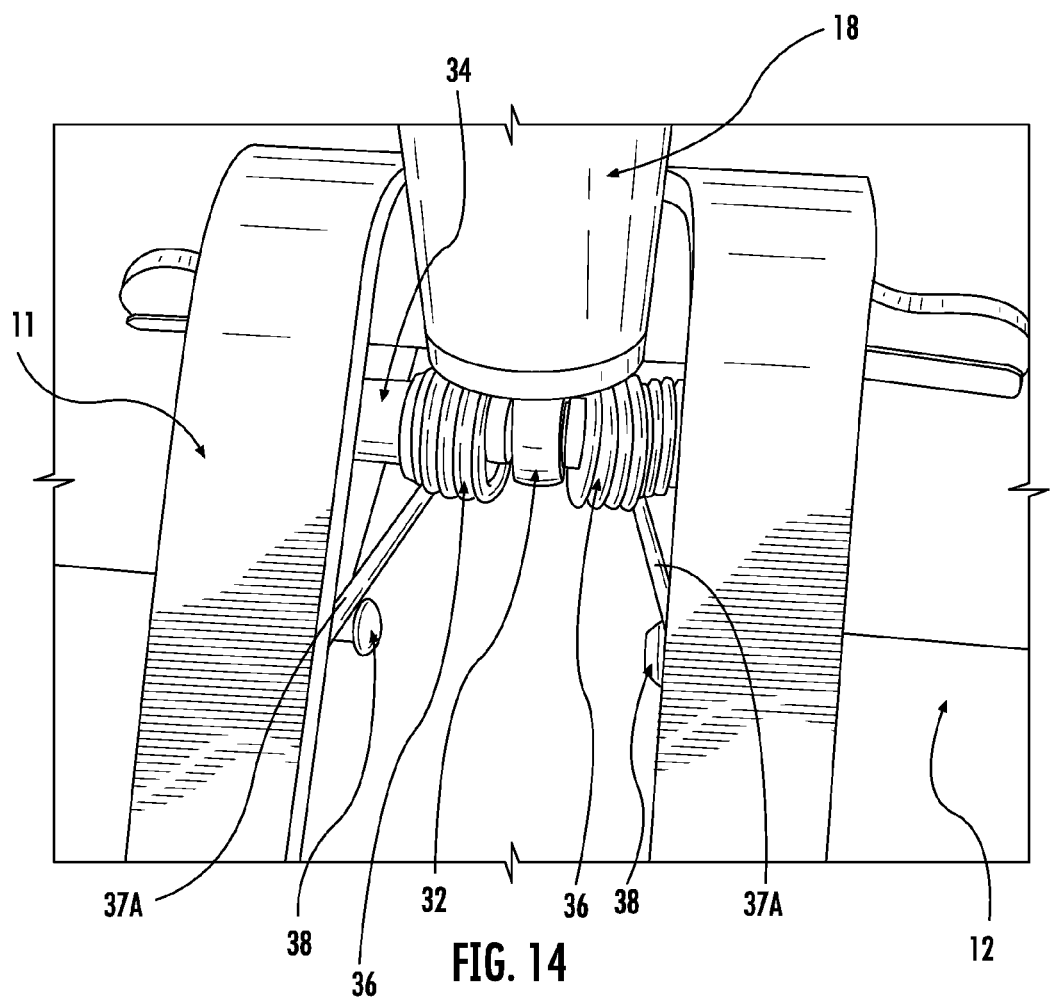
FIG. 14 shows an enlarged close-up view thereof.
Figure 15:
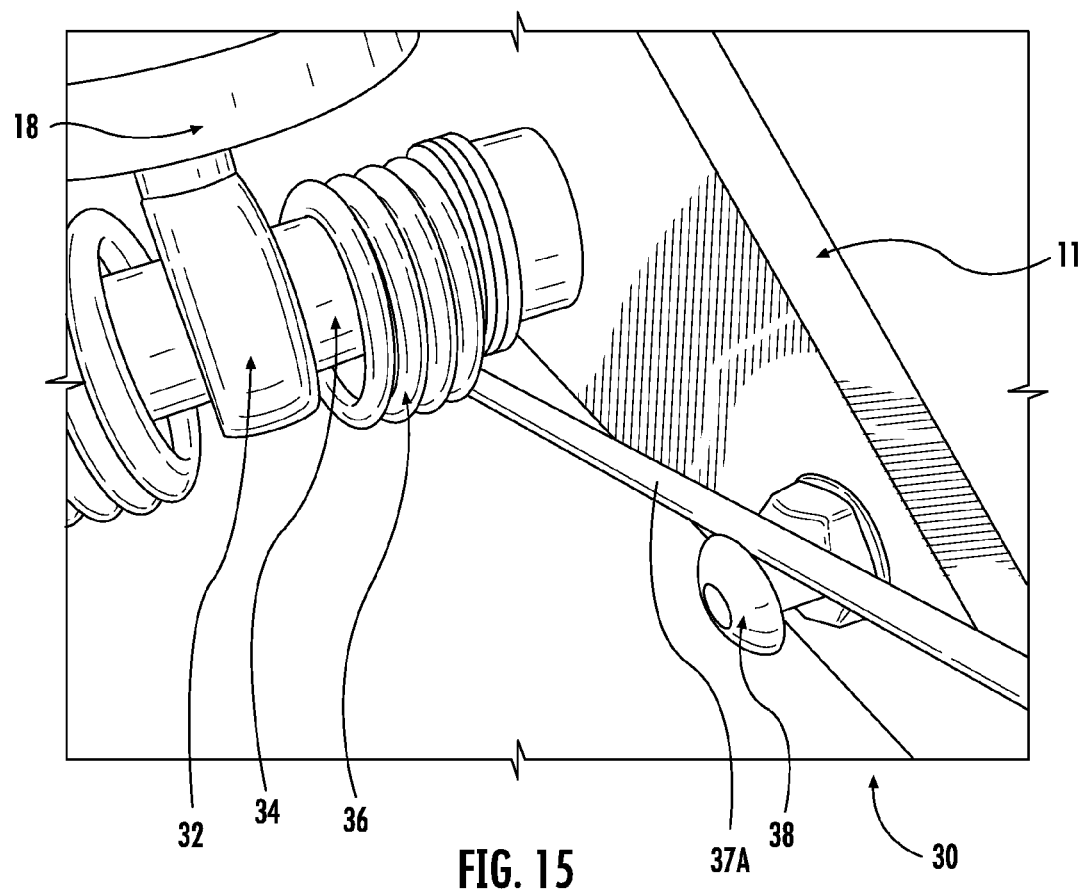
FIG. 15 shows an enlarged close-up perspective view thereof.

In FIG. 13, a front view shows where a rod end 32 is installed into the bottom end of the post 18 and springs 36 are used to spring-bias that connection. FIG. 14 is a close-up view the installation of the rod end 32 into the bottom of the post 18. A transverse rod 34 runs through the aperture 32a pivoting ball-joint like portion 32b of the rod end 32 (as in FIG. 18a) and is connected to the mount (or housing) 11, thereby connecting the post 18 to the mount 11. The coil springs 36 are routed about the transverse rod on both sides of the rod end. Each coil spring 36 has a first free end 37A and a second free end 37B. As seen in FIGS. 14 and 15, first free ends 37A of both of the springs are respectively captured by a screw post 38 on the mount 11.

Figure 16:
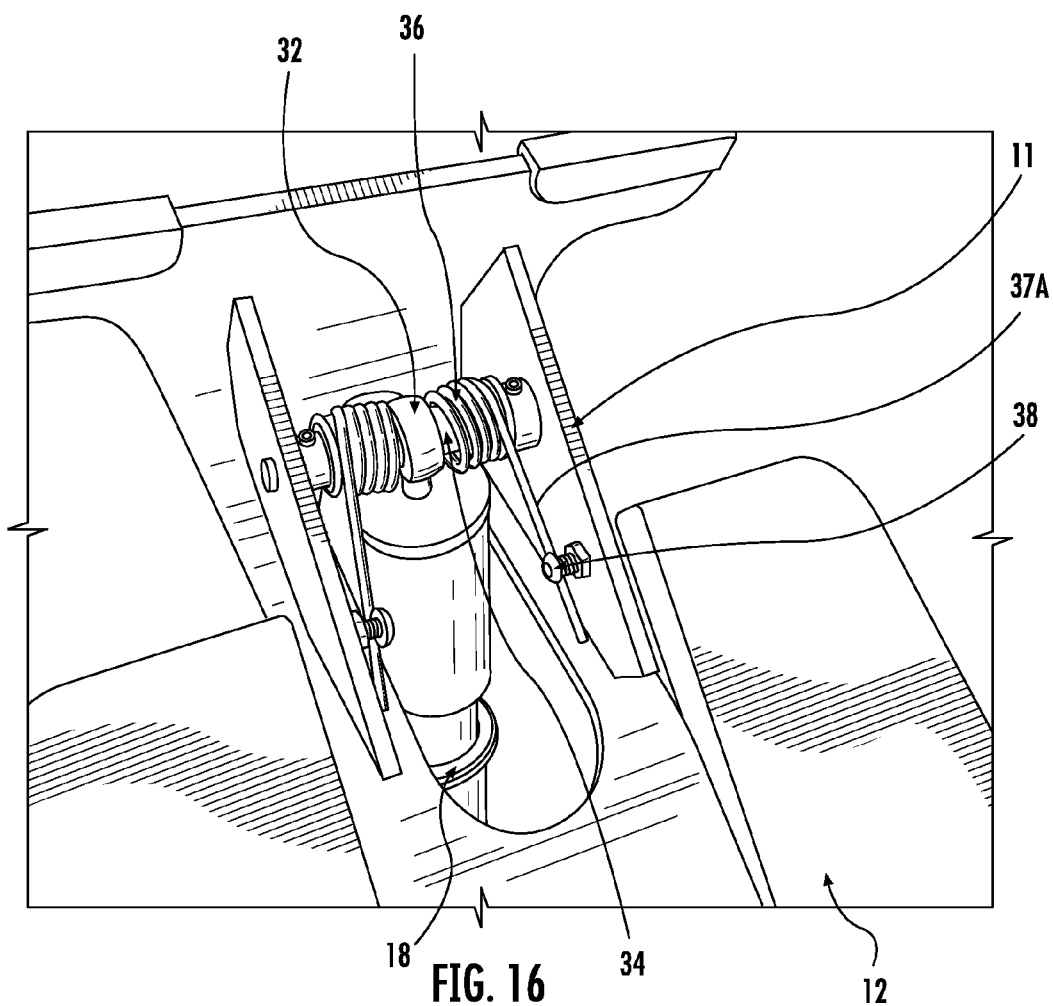
FIG. 16 shows a bottom view of one embodiment of the joint connection of the present invention.
Figure 17:
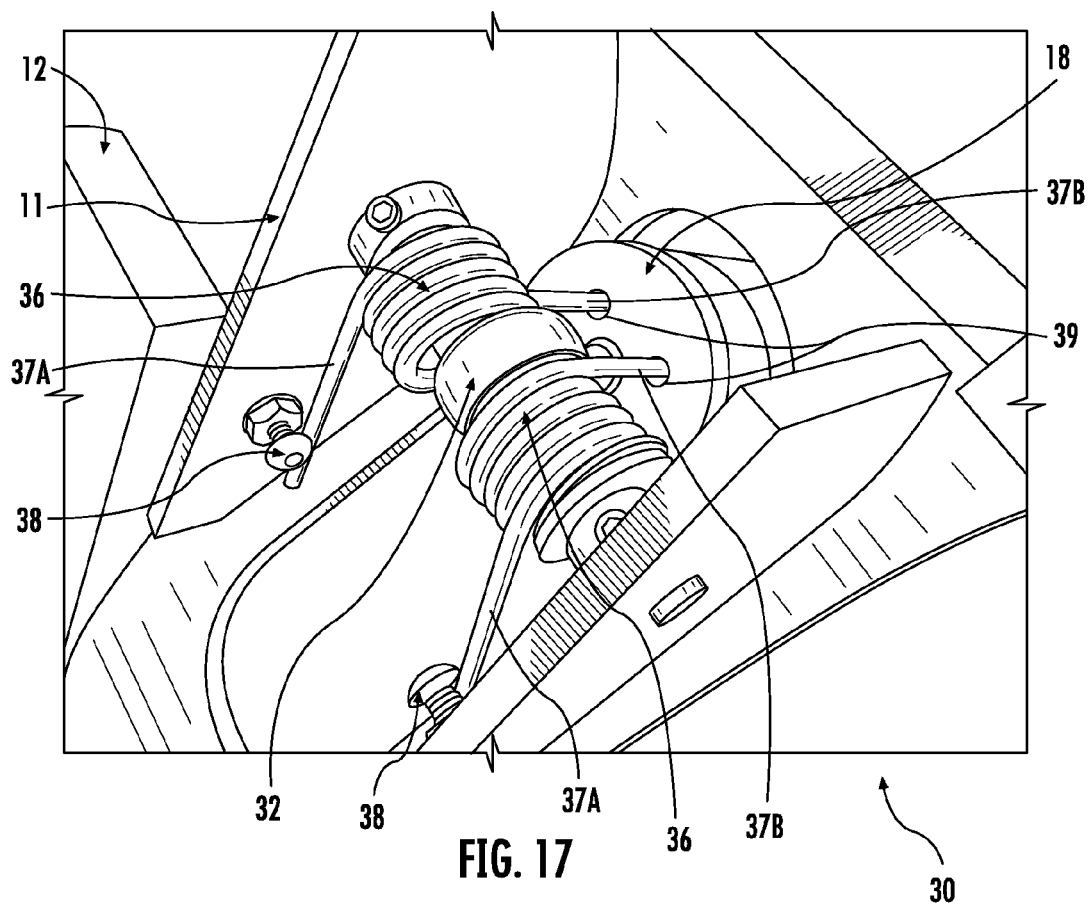
FIG. 17 shows a bottom perspective view of one embodiment of the joint connection of the present invention.
Figure 18A:
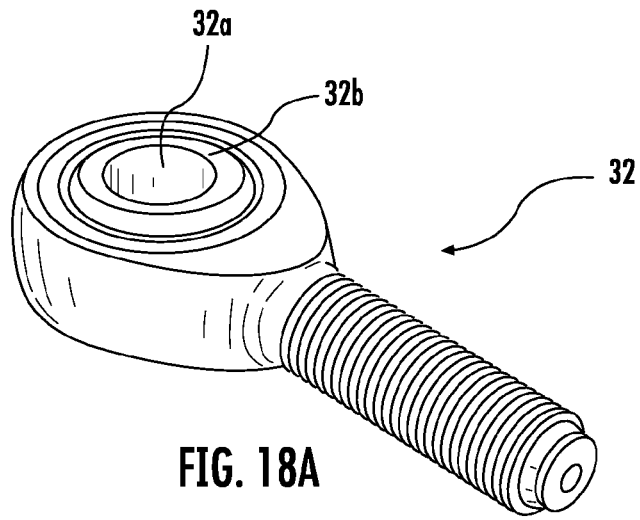
FIG. 18a shows a prior art male threaded steel ball joint rod end employed in one embodiment of the seat of the present invention.
Figure 18B:
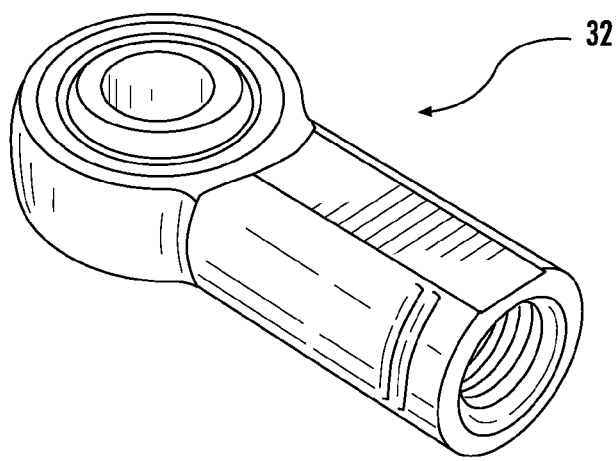
FIG. 18b shows a prior art female threaded steel ball joint rod end employed in another embodiment of the seat of the present invention.
Figure 18C:
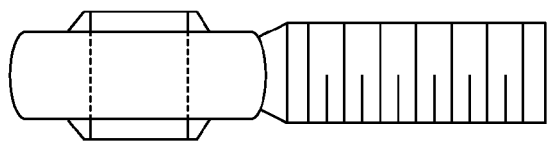
FIG. 18c shows a side view of a prior art male threaded steel ball joint rod end employed in one embodiment of the seat of the present invention.
Figure 18D:
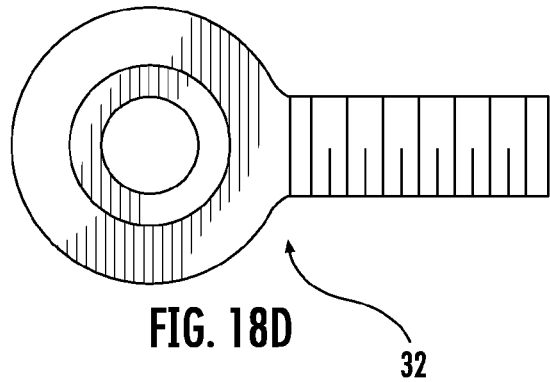
FIG. 18d shows a top view of the prior art male threaded steel ball joint rod end.

In the bottom view of FIG. 16, both of the first free ends 37A, of the springs captured by their respective screw posts 38 on the mount 11. In FIG. 17, a further bottom view is shown that illustrates the second free ends 37B of the coil springs being captured in their own respective apertures 39 in the bottom of the post. Thus, having the first and second free ends 37A, 37B of the springs captured (one on the mount 11 and one on the post 18) the post will then be spring-biased relative to the base. The springs are located and tuned so that the seat is spring-biased to a resting "home" position.

It is possible to replace the springs of FIGS. 14-17 with any spring or springs capable of spring biasing the post to a home position relative to the mount. Although the connection is shown as having two coil springs, other embodiments may have springs that are not coil springs. Also, other embodiments may have just a single spring or more than two springs.

Although the first and second spring ends 37A, 37B are shown as engaging screw posts 38 on the mount 11 and apertures 39 on the post 18, either of these contact points could employ screw posts or apertures. Additionally, other structures can be used to provide a spring biased position of the post with respect to the mount. For example, ends of the springs could be permanently fastened to the post and/or mount by threaded fasteners, non-threaded fasteners, welded connections, and other fasteners. Also, although the apertures 39 are shown as generally circular holes in FIG. 17, they may be of any shape that is capable of accommodating an end of a spring while providing a surface that supports that spring end in tension or compression.

Figure 10:
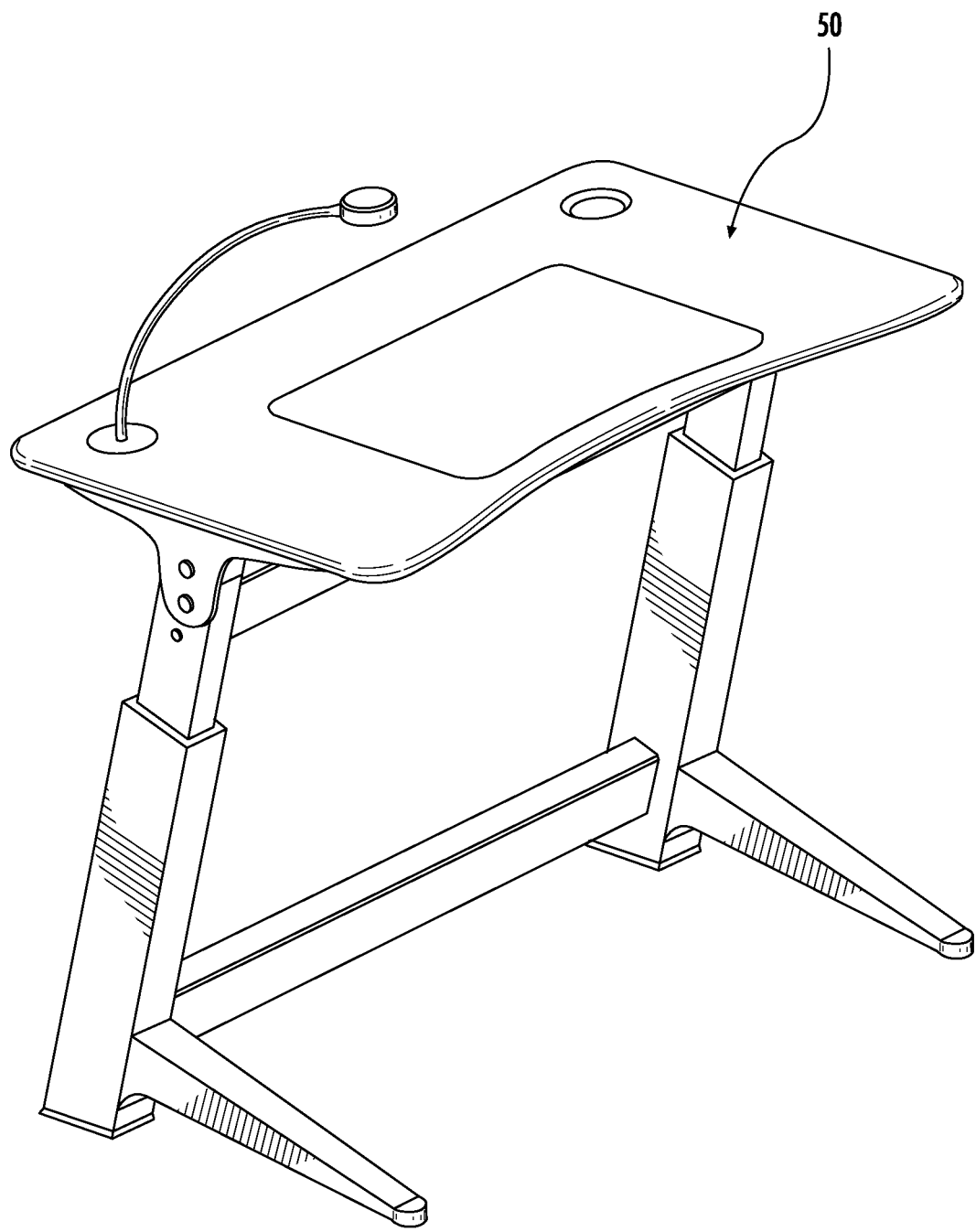
FIG. 10 is a perspective view of an optional desk for use with the seat of FIG. 3.

The nature of the joint rod end 32 enables side-to-side and front to back movement (and locations therebetween as dictated by the characteristics of the rod end) to give the upright seat is unique freedom of motion. FIGS. 18a-d provide as an example high-strength steel ball joint rod ends that can be employed by the present invention The upright active sitting seat of this invention can be used in conjunction with a freestanding desk/workstation 50, such as that shown in FIG. 10, located proximal to the seat of FIG. 3 to provide a comfortable work surface. Wheels 40 on the base 12 allow the user to tilt the base so that it rolls along the floor and position the active sitting seat 10 near a desk 50. The user can then move the seat 20 into a comfortable position via the articulating joint 30 without having to reposition the base 12 with respect to the desk 50.

While the upright active sitting seat is preferably a standalone unit as shown in FIGS. 3-9, it may be provided in a version that incorporates or integrates an adjustable work surface or table top. This work surface would accommodate ease of entry and exit by way of a sliding tabletop surface or support legs that would angle back and forth. In a sense this version is a self-contained small footprint standing workstation.

It would be appreciated by those skilled in the art that various changes and modifications can be made to the illustrated embodiments without departing from the spirit of the present invention. All such modifications and changes are intended to be covered by the present invention.

What is claimed is:

1. A chair, comprising:
   a seat support;
   a post member having a first end and a second end; the seat support being connected to the first end of the post member;
   a mount member; the second end of the post member being movably connected to the mount member thereby providing fore and aft movement of the post member relative to the mount member;
   a ball joint rod end and a transverse rod; the ball joint rod end being connected to the second end of the post member and the transverse rod being connected to the mount member and routed through the ball joint rod end thereby connecting the post member to the mount member with lateral play;
   at least one spring connected to the post member and the mount member; the at least one spring is a pair of coil springs, each having a first free end and a second free end, encircling the transverse rod respectively on opposite sides of the ball joint rod end; the first free end of each of the coil springs being in communication with the post member and the second free end of each of the coil springs being in communication with the mount member thereby spring-biasing the post member to the mount member;
   wherein the pair of coil springs is configured to spring-bias the post member to a home position relative to the mount member.

2. The chair of claim 1, wherein the first end of the post member is movable about at least two axes relative to the mount member.

3. The chair of claim 1, wherein the post member is pneumatically adjustable.

4. The chair of claim 3 further comprising:
   a base member connected to the mount member.

5. The chair of claim 4, further comprising:
   means for adjusting the length of the post member.

6. The chair of claim 5, wherein the base member further includes an angled footrest.

7. The chair of claim 6, further comprising:
   a plurality of wheels connected to the base.

8. The chair of claim 4, wherein the mount member is adjustably connected to the base member.

9. The chair of claim 1, wherein the seat support includes a cushioned ergonomically configured seat pan.

10. The chair of claim 1, wherein the seat support is connected to the post member by a living hinge.

11. A chair, comprising:
    a seat support;
    a post member having a first end and a second end; the seat support being connected to the first end of the post member; the first end of the post member is movable about at least two axes relative to the mount member;
    a mount member; the second end of the post member being movably connected to the mount member via a ball joint rod end and transverse rod; the ball joint rod end being connected to the second end of the post member and the transverse rod being connected to the mount member and routed through the ball joint rod end thereby connecting the post member to the mount member; a pair of coil springs encircling the transverse rod respectively on opposite sides of the ball joint rod end; the post member being configured and arranged for fore and aft movement relative to the mount member;
    the ball joint rod end being connected to the second end of the post member and the transverse rod being connected to the mount member and routed through the ball joint rod end thereby connecting the post member to the mount member with lateral play;
    a base member connected to the mount member;
    the pair of coil springs, each having a first free end and a second free end, encircling the transverse rod respectively on opposite sides of the ball joint rod end; the first free end of each of the coil springs being in communication with the post member and the second free end of each of the coil springs being in communication with the mount member thereby spring-biasing the post member to the mount member;
    wherein the springs are configured to spring-bias the post member to a home position relative to the mount member.

12. The chair of claim 11, further comprising:
    means for adjusting the length of the post member.

13. The chair of claim 11, wherein the base member further includes an angled footrest.

14. The chair of claim 11, wherein the mount member is adjustably connected to the base member.

* * * * *